(12) United States Patent
Farkas

(10) Patent No.: US 8,923,112 B2
(45) Date of Patent: Dec. 30, 2014

(54) TECHNIQUE FOR CONTROLLING DATA FORWARDING IN COMPUTER NETWORKS

(75) Inventor: János Farkas, Kecskemét (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 298 days.

(21) Appl. No.: 13/394,446

(22) PCT Filed: Oct. 2, 2009

(86) PCT No.: PCT/EP2009/007087
§ 371 (c)(1),
(2), (4) Date: May 16, 2012

(87) PCT Pub. No.: WO2011/038750
PCT Pub. Date: Apr. 7, 2011

(65) Prior Publication Data
US 2012/0281524 A1    Nov. 8, 2012

(51) Int. Cl.
| | | |
|---|---|---|
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *G06F 15/173* | (2006.01) | |
| *H04L 12/701* | (2013.01) | |
| *H04L 12/707* | (2013.01) | |
| *H04L 12/703* | (2013.01) | |
| *H04L 12/753* | (2013.01) | |
| *H04L 12/721* | (2013.01) | |

(52) U.S. Cl.
CPC ................ *H04L 45/00* (2013.01); *H04L 45/24* (2013.01); *H04L 45/28* (2013.01); *H04L 45/48* (2013.01); *H04L 45/66* (2013.01); *H04L 43/0817* (2013.01)
USPC ............ 370/217; 370/225; 370/244; 709/239

(58) Field of Classification Search
None
See application file for complete search history.

(56) References Cited

U.S. PATENT DOCUMENTS 6,047,331 A * 4/2000 Medard et al. ................ 709/239
7,035,937 B2 * 4/2006 Haas et al. .................... 709/239

(Continued)

OTHER PUBLICATIONS

IEEE Computer Society, "IEEE Standard for Local and metropolitan area networks—Virtual Bridged Local Area Networks, Amendment 5: Connectivity Fault Management", IEEE Std. 802.1ag, Dec. 17, 2007, pp. 1-260, the Institute of Electrical and Electronics Engineers, Inc., New York, US.

(Continued)

*Primary Examiner* — Gregory Sefcheck
*Assistant Examiner* — Suk Jin Kang
(74) *Attorney, Agent, or Firm* — Coats & Bennett, PLLC

(57) ABSTRACT

Technique for controlling data forwarding in a computer network are provided. The network comprises a set of nodes for forwarding data, wherein a first node is associated with a primary tree and a backup tree, wherein the primary tree defines a default path for the first node to forward data to a second node and the backup tree defines another path for the data forwarding in case of a failure of the primary tree. The basic principle of the techniques is to notify the first node of a failure of the primary tree wherein the notification is provided by the second node. The techniques are particularly beneficial for computer networks offering multipoint services, such as SPB-controlled networks, because the techniques ensure the congruency of the forward and reverse paths even when the data forwarding has been switched from the primary tree to the backup tree.

15 Claims, 11 Drawing Sheets

(56) References Cited

U.S. PATENT DOCUMENTS

| | | | |
|---|---|---|---|
| 7,835,378 B2* | 11/2010 | Wijnands et al. | 370/408 |
| 8,260,922 B1* | 9/2012 | Aggarwal et al. | 709/226 |
| 8,400,910 B1* | 3/2013 | Busch et al. | 370/217 |
| 2003/0005149 A1* | 1/2003 | Haas et al. | 709/238 |
| 2005/0086469 A1* | 4/2005 | Dunagan et al. | 713/163 |
| 2007/0036072 A1* | 2/2007 | Raj et al. | 370/225 |
| 2007/0047556 A1* | 3/2007 | Raahemi et al. | 370/395.53 |
| 2007/0183317 A1* | 8/2007 | Vasseur et al. | 370/225 |
| 2007/0195701 A1* | 8/2007 | Menth et al. | 370/238 |
| 2008/0123524 A1* | 5/2008 | Vasseur et al. | 370/228 |
| 2008/0281987 A1* | 11/2008 | Skalecki et al. | 709/253 |
| 2008/0291910 A1* | 11/2008 | Tadimeti et al. | 370/389 |
| 2009/0003223 A1* | 1/2009 | McCallum et al. | 370/244 |
| 2009/0003313 A1* | 1/2009 | Busch et al. | 370/352 |
| 2009/0034413 A1* | 2/2009 | Sajassi et al. | 370/228 |
| 2009/0175176 A1* | 7/2009 | Mohan | 370/244 |
| 2009/0245248 A1* | 10/2009 | Arberg et al. | 370/390 |
| 2010/0208593 A1* | 8/2010 | Soon et al. | 370/242 |
| 2011/0075574 A1* | 3/2011 | Perelstain et al. | 370/248 |
| 2012/0201122 A1* | 8/2012 | Mohan | 370/217 |

OTHER PUBLICATIONS

IEEE Computer Society, "Draft Standard for Local and Metropolitan Area Networks—Virtual Bridged Local Area Networks—Amendment 9: Shortest Path Bridging", IEEE P802.1aq/D1.5, Dec. 17, 2008, pp. 1-193 the Institute of Electrical and Electronics Engineers, Inc., New York, US.

Menth, M. et al., "Network Resilience Through Multi-Topology Routing," Research Report Series, XX, XX, No. 335, May 1, 2004; pp. 1-10, XP-002999123.

Ping et al., "A Comparison of Hard-state and Soft-state Signaling Protocols," XP-001224085; Computer Science Department, University of Massachusetts at Amherst; pp. 1-12.

* cited by examiner

Backup Tree Set 1

Backup Tree Set 2

Backup Tree Set 3

TECHNIQUE FOR CONTROLLING DATA FORWARDING IN COMPUTER NETWORKS

TECHNICAL FIELD

The present disclosure relates to computer networks and, in particular, to methods and devices for controlling data forwarding and providing protected multipoint connections in a computer network comprising multiple data-forwarding nodes. Further, the disclosure relates to ongoing standardization activities with respect to IEEE 802.1aq.

BACKGROUND

A computer network allows a number of interconnected computers to communicate between themselves and to share resources and/or information. Communication links, either wired or wireless, are provided between the computers to facilitate the data transmission and reception therebetween. Computer networks are classified according to different criteria, such as scale, purpose, the hardware and software technology used to interconnect the individual devices in the network. For instance, a local area network (LAN) is a computer network covering a small physical area, like a home or an office. Ethernet is a suite of frame-based computer networking technologies for LANs. Standardized as IEEE 802.3, Ethernet networks have evolved to be one of the most popular computer networks of today.

Often, a computer in the network is not directly connected to another, but via one or more intermediate electronic devices. The intermediate devices are capable of forwarding, or relaying, data originated from one or more source computers to one or more destination computers or one or more other intermediate devices. Examples of such intermediate devices are hubs, bridges, switches, routers, and so on. In the following, the intermediate devices are referred to as "nodes".

Some types of nodes, such as bridges and routers, do not simply forward data "blindly", but are implemented with some routing intelligence so they can analyze the incoming data and to determine, from the plurality of nodes around them, the proper one or ones for the data to be forwarded onwards. For example, a bridge can analyze the OSI layer-2 address of the incoming data to determine if the data can be forwarded to a certain neighbouring bridge. In the context of this application, the term "routing" denotes a process of selecting paths in a network along which to send network traffic. "Routing" is not limited to routers, which are usually considered as layer-3 devices.

Numerous routing protocols have been developed over the years to specify how nodes on a computer network communicate with each other, and in particular, how routing-related information can be disseminated among them so that each node obtains knowledge of the topology of the network. This knowledge allows each node to calculate, using certain routing algorithm, the best path(s) for it to forward data to each other node.

Link-state protocols are a major class of routing protocols widespread in computer networks, and a specific link state protocol is the Intermediate System to Intermediate System protocol, or IS-IS. IS-IS operates by reliably flooding topology information throughout a network of nodes. Each node then independently builds a picture of the network's topology. Data, preferably in packets, frames, or datagrams, is forwarded based on the best topological path through the network to the destination. IS-IS uses the Dijkstra algorithm for calculating the best path through the network.

The calculation of best paths between the nodes must be carefully designed so that data forwarding there-between can take place in a smooth, reliable, and efficient manner. The Spanning Tree Protocol (STP) has been proposed for this purpose. Initially defined in the IEEE Standard 802.1D, STP is a link layer (corresponding to OSI layer-2) network protocol that ensures a loop-free topology for a LAN—loops should be avoided because they result in flooding the network. As its name suggests, STP creates a tree structure of loop-free leaves and branches that spans the entire network. The spanning tree allows a network designer to include redundant links to to the physical topology without the danger of forming loops, or the need for manual enabling/disabling of these backup links.

As an evolution of the initially standardized STP, the Rapid Spanning Tree Protocol (RSTP) provides faster spanning tree convergence after a topology change. A further evolution is the Multiple Spanning Tree Protocol (MSTP), which was originally defined in IEEE 802.1s and later merged into IEEE 802.1Q. As an extension to the RSTP protocol, MSTP further develops the usefulness of virtual LANs (VLANs). MSTP configures a separate spanning tree for each VLAN group and blocks all but one of the possible alternate paths within each spanning tree.

There is an on-going effort for enhancing the computer networks in order to support carrier grade services. IEEE 802.1Qay PBB-TE has been defined to support point-to-point and point-to-multipoint traffic engineered services and to provide protection switching for point-to-point services. That is, in case of a failure of a certain link connecting two nodes, or a failure of any intermediate(s) node along that link, the data forwarding between the two nodes is automatically switched from the original, default path to the alternative, backup path. Such a switching strategy effectively protects the data forwarding from path failures and is thus known as protection switching. Protection switching aims to limit the failover time, e.g. the time for executing the switching over from the default path to the backup path, as short as possible. PBB-TE implements protection switching only for point-to-point connections.

PBB-TE supports protection switching, which requires that both the default, or operational path and the backup path are monitored; this is realized by Continuity Check Messages (CCM) of the Ethernet Connectivity Fault Management (CFM) protocol. CCM is one of the standard Ethernet mechanisms that detect and signal connectively failures in a network.

Defined in IEEE802.1ag, CFM specifies certain operation, administration, and management (OAM) capabilities to help network administrators debug the network. Three types of CFM messages are supported by the current standard: Continuity check, Loopback, and Traceroute. The continuity check messages (CCMs) are multicast heartbeat messages exchanged between nodes, enabling them to detect loss of service connectivity amongst themselves. CCMs are unidirectional and do not solicit any response. The absence of CCM from a source node or specific information received in one of the CCM's Type Length Values (TLVs) may indicate to the destination node that the connectivity between the nodes has been disrupted. Protection switching is then automatically invoked. The current CFM technologies are able to achieve a failover time of about 50 ms.

According to the latest CFM standard, a CCM message comprises a Remote Defect Indication (RDI) field; however, the standard does not specify how this field can be used.

The control protocols available for multipoint-to-multipoint services, which are also referred to as multipoint services, are RSTP and MSTP. An ongoing standardization project in IEEE is 802.1aq Shortest Path Bridging (SPB) which defines a novel control protocol for networks based on link state principles. SPB is also able to support multipoint services.

In brief, SPB applies link state routing protocols, e.g. IS-IS, to the utilization of mesh topologies for Ethernet bridging. SPB forwards data on shortest path trees with minimum path cost as a first order tie-breaker. Two distinctive characteristics of the SPB are:

for each node, at least one shortest path tree (SPT) is provided with the node as the root of the tree; and for any pair of nodes A and B, the unicast path from A to B is the exact reverse of the path from B to A (reverse path congruency), and all multicast traffic between the two nodes follows the unicast path (multicast and unicast congruency).

In SPB, conventional bridge learning is used to associate (customer) MAC addresses to ports and hence routes through the SPB region. The source-rooted tree associated with each node is assigned a unique VLAN ID (the SPVID) to identify it.

Providing resiliency for multipoint services in other computer networks besides Ethernet is also an important issue. For example, MPLS can only provide fast failover for point-to-point services but not for multipoint services.

Despite of their different control protocol principles, RSTP/MSTP and SPB (as it is described in the current standardization draft) are common in their fault handling principle. Namely, both SPB and RSTP/MSTP apply restoration for fault handling, i.e. they dynamically reconfigure the forwarding topologies if a network element (a node or a link) breaks down. However, the restoration time of the forwarding topologies, which equals to the failover time, does not have any predefined upper bound but depends on several factors. For instance, the size of the network, the type of the network topology and the location of the failure all significantly influence the failover time. Thus, the failover time is not controlled, not bounded but is different scenario by scenario. That is the failover time may increase above the desired level for multi-point services in case of all control protocols available today, i.e. both in case of RSTP/MSTP and SPB.

The problem is similar in other computer networks, i.e. they only provide restoration for multipoint services thus not assuring any guarantee for the failover time.

SUMMARY

It is desired to provide a control technique for computer networks so as to facilitate the data forwarding therein in a fast, reliable, and robust manner. Specifically, the desired solution is expected to enable protection switching when applied to computer networks capable of offering multipoint services, such as SPB-controlled networks. Until now, no specifications or concrete techniques are known for realizing protection switching for multipoint services.

To realize the solution, a first method for controlling forwarding of data in a computer network is provided. The network comprises a set of nodes capable of forwarding data therebetween. Trees are created for the nodes for data forwarding. A first node is associated with a primary tree and a backup tree, wherein the primary tree specifies a default path for the first node to forward data to a second node while the backup tree defines a different path as a backup. That is, in case of a failure of the primary tree, the first node may use the backup tree to forward data to the second node. The method is performed by the first node and comprises the steps of transmitting one or more continuity check messages on the primary tree and the backup tree, detecting occurrence of a failure of the primary tree upon receiving a failure signal transmitted by the second node, wherein the failure signal indicates a failure status of the primary tree, and upon detection of the failure of the primary tree, switching the forwarding of data from the primary tree to the backup tree.

The first node may receive the failure signal transmitted from the second node via different paths, such as the backup tree or simply another tree that is operational. The path may even be a non-tree link (e.g., a direct connection). It suffices that the path provides a connection for the failure signal to travel from the second node to the first node.

The solution is for example useful for networks which must maintain the congruency/symmetry of the forward and reverse paths at all times. Hence, the solution is well suited for SPB-controlled networks. Nevertheless, the solution can also be implemented to other types of networks. One principle of the solution, which can be appreciated from the description below, is to notify the source node of a failure of a default data forwarding path, wherein the notification is mainly provided by the destination node on a backup path.

The failure signal can take different forms. As a first variant, the failure signal may comprise one or more modified continuity check messages. The wording "modified" indicates a difference from the continuity check messages transmitted by the first node on the primary tree and the backup tree. For example, the difference may concern the Remote Defect Identification (RDI) field comprised in a continuity check message. In the conventional, unmodified continuity check message, the RDI field is cleared, while in the modified continuity check message referred to in this variant, the RDI field is set. The set RDI field serves to indicate the failure status of the primary tree. When the first node ceases to receive the modified continuity check messages transmitted from the second node, it switches the forwarding of data from the backup tree back to the primary tree.

As a second variant, the failure signal comprises a failure notification message which comprises an identification of the primary tree. Such a failure signal indicates to the recipient, e.g., the first node, that a failure has occurred on the primary tree.

If the first node, after switching to the backup tree, receives a different, reparation signal transmitted from the second node, wherein the reparation signal indicates a restored status of the primary tree, the first node may switch the forwarding of data from the backup tree back to the primary tree. In a specific variant, the reparation signal may comprise a reparation notification message which includes an identification of the primary tree so that the recipient, e.g. the first node, will know that it is the primary tree that has been restored.

The failure notification message and/or the reparation notification message can take many forms as long as they fulfil the indication purposes mentioned above. For instance, the current CFM protocol can be extended to provide suitable data structures for the failure notification message and/or the reparation notification message. According to one variant, a new CFM message format can be designed for either one of the notification messages; according to another variant, a new Type Length Value (TLV) indicating the failure notification or reparation notification can be added into a standard continuity check message.

To enhance failure management, a plurality of backup trees can be provided for the first node. All the backup trees define different backup paths for the first node to forward data to the second node. In order to monitor the operational status of the primary tree as well as the backup trees, the first node may transmit one or more continuity check messages on the primary tree as well as all the backup trees. Further, the method may comprise the steps of obtaining priority information of the backup trees, for example, a list of the priorities of the backup trees; and upon detection of the failure of the primary tree, switching the forwarding of data to a particular backup tree which is in operation (i.e., with no failure occurrence) and with a certain priority. For instance, the first node may switch the forwarding of data to an operational backup tree with the highest priority in the list.

The plurality of backup trees may be grouped into one or more sets. If this is the case, the first node may further perform the steps of obtaining priority information of the backup-tree sets, e.g., a list of priorities of the sets; and, upon detection of the failure of the primary tree, switching the forwarding of data to a particular backup-tree set with a certain priority and whose trees are all in operation.

To realize the solution, a further method for controlling forwarding of data in a computer network is provided. Like in the scenario of the first method, the network comprises a set of nodes capable of forwarding data therebetween. Trees are provided for the nodes for forwarding data. A first node is associated with a primary tree and a backup tree, wherein the primary tree defines a default path for the first node to forward data to a second node while the backup tree defines another, different path for the data forwarding in case of a failure of the primary tree. The method comprises several steps performed by the second node: receiving one or more continuity check messages transmitted on the primary tree from the first node, detecting occurrence of a failure of the primary tree when at least one continuity check message transmitted from the first node is not received at the second node, and notifying the first node about the failure of the primary tree by transmitting a failure signal which indicates a failure status of the primary tree.

The second node may transmit the failure signal to the second node via different paths, such as the backup tree or simply another tree that is operational. The path may even be a non-tree link. It suffices that the path provides a (e.g., direct) connection for the failure signal to travel from the second node to the first node.

In order to increase the accuracy of detection, the second node can decide on the occurrence of the failure only when it fails to receive a certain number of consecutive continuity check messages transmitted from the first node. Further, in order to increase the probability that the predefined number of consecutive continuity check messages are all detected to be missing before the decision on the failure occurrence is made, a hold-off time may be applied, e.g., as a predefined time interval. That is, the occurrence of the failure may be detected when a predefined time interval has expired after a predefined number of consecutive continuity check messages transmined from the first node or not received at the second node.

Similar to the first method, the failure signal referred to in the second method can take different forms and provided in different manners. As a first variant, the second node can generate one or more modified continuity check messages which serve as the failure signal. Compared with a conventional continuity check message, a modified continuity check message is different (e.g., in at least that the RDI-field thereof is set, wherein the set RDI-field is defined to indicate the failure status of the primary tree).

As long as the primary tree remains in the failure status, the (unmodified) continuity check messages transmitted from the first node on the primary tree will not reach the second node. Accordingly, the second node may continuously transmit the modified continuity check messages until the failure of the primary tree is resolved, i.e., until the second node receives again the (unmodified) continuity check messages originated from the first node.

As a second variant, the second node can provide the failure signal by generating a failure notification message which comprises an identification of the primary tree. Such a message indicates to the recipient, e.g., the first node, that it is the primary tree that is in a failure status.

After having switched the data forwarding to the backup tree, when the second node receives again the continuity check messages transmitted from the first node on the primary tree, it interprets that the primary tree has been restored and data forwarding on the primary tree can be resumed. To indicate to the first node the restored status of the primary tree, the second node can transmit another signal, a so-called reparation signal. The reparation signal may be provided by generating a reparation notification message which comprises an identification of the primary tree. Thus, upon receipt of such a reparation signal, the first node will know that the primary tree that has been restored.

To accurately detect that the primary tree has indeed been restored, the second node can "postpone" the decision making until a predetermined number of consecutive continuity check messages originated from the first node are received again at the second node. That is, the reparation signal may be transmitted only after the receipt of the predetermined number of consecutive continuity check messages. As a further enhancement, a hold-off time can be applied. A combination of the above two enhancements is also possible; i.e., the reparation signal may be transmitted when a predetermined time interval has expired after a predetermined number of consecutive continuity check messages are received again at the second node.

Also like in the first method, the first node may be associated with a plurality of backup trees. In this case, the second node may transmit the failure signal on all the backup trees which are operational. Further, the plurality of backup trees may be grouped into one or more sets. Upon detection of the failure of the primary tree, the is second node may transmit the failure signal only on those backup trees belonging to the sets whose backup trees are all operational.

The primary tree may be calculated using an algorithm that computes a shortest path tree. The backup tree or the backup trees may be calculated using the same shortest path tree algorithm except for that, during the calculation, the network component causing the failure of the primary tree should be excluded from the topology. The network component can be a link or a node.

The solution can also be realized by a computer program product comprising program portions for performing the steps of the above-mentioned methods when the computer program product is run on a computing device. The computing device may be the first node or the second node themselves, but it can also be a certain component or a set of components integrated in the first or second node. Further, the computing device may be a stand alone product which can be integrated in the first or second node and to control the first or second node to perform the corresponding methods. The computer program product may be stored on a computer readable recording medium.

The solution can further be realized by means of hardware. According to a first hardware aspect, a node for a computer network is provided wherein the node is configured to forward data to another node in the network. The node comprises a processor configured to associate the node with a primary tree and a backup tree which define shortest path tree paths for the node to forward data to the other node. While the primary tree defines a default path for the data forwarding, the backup tree offers another path that the node can use in case of a failure of the primary tree. The node further comprises a transmitter configured to transmit one or more continuity check messages on the primary tree and the backup tree. The node further comprises a receiver configured to receive a failure signal transmitted from the other node. A further component of the node is a detector for detecting occurrence of a failure of the primary tree. The detector is configured to detect the failure occurrence based on receipt of the failure signal transmitted from the other node, wherein the failure signal indicates a failure status of the primary tree. Further, the processor is configured to, upon detection of the failure of the primary tree, switch the forwarding of data from the primary tree to the backup tree.

The detector can detect the occurrence of the failure of the primary tree based on different variants of the failure signal. As a first variant, the failure signal may comprise one or more modified continuity check messages and accordingly the detector can detect the failure occurrence based on the presence of such modified continuity check messages in the failure signal. As mentioned above, the modified continuity check messages differ from the conventional continuity check messages in that, for example, the RDI field in a modified message is set rather than cleared. The set RDI field serves to indicate the failure status of the primary tree.

When the node ceases to receive the modified continuity check messages transmitted from the other node, it assumes that the failure of the primary tree has been resolved. Hence, the processor may switch the forwarding of data from the backup tree back to the primary tree.

Another variant of the failure signal comprises a failure notification message which comprises an identification of the primary tree. Upon receiving such a failure notification message, the detector can detect that a failure has occurred to the primary tree.

Once the data forwarding has been switched to the backup tree, the processor of the node may switch the forwarding of data back to the primary tree. The processor may be configured to do so upon receipt of a reparation signal from the other node wherein the reparation signal indicates a restored status of the primary tree.

In addition to the backup tree above, the processor may further associate the node with a plurality of backup trees. In this case, the transmitter may transmit the continuity check messages on not only the primary tree but also all the backup trees. Further, the backup trees may be assigned with different priorities and the processor can be configured to, upon detection of the failure of the primary tree, select a backup tree in operation with a certain priority and switch the forwarding of data from the primary tree to the selected backup tree. For example, the processor may select the operational backup tree with the highest priority.

Still further, the processor may be configured to group the plurality of backup trees into one or more sets. The sets may be assigned with different backup-tree-set priorities. Accordingly, upon detection of the failure of the primary tree, the processor may select a certain backup-tree set with a certain priority and whose trees are all in operation and then switch the forwarding of data from the primary tree to the selected backup tree set.

According to a second hardware aspect, a node for a computer network is provided wherein the node is configured to receive data forwarded from another node in the network. For the purpose of clarity, the node is referred to as "the second node" while the other node "the first node". The first node is associated with a primary tree and a backup tree, wherein the primary tree defines a default path for the first node to forward data to the second node and the backup tree lays out another path for the data forwarding in case of a failure of the primary tree. The second node comprises a receiver configured to receive one or more continuity check messages transmitted on the primary tree from the first node. The second node further comprises a detector for detecting occurrence of a failure of the primary tree wherein the detection is based on that at least one continuity check message originated from the first node is not received at the receiver. The second node further comprises a processor configured to notify the first node about the failure of the primary tree, the notification being effected by providing a failure signal indicating a failure status of the primary tree. Further, the second node comprises a transmitter for transmitting the failure signal to the first node.

The detector of the second node may be configured to detect the occurrence of the failure of the primary tree when a predefined time interval has expired after a predefined number of consecutive continuity check messages originated from the first node are not received at the second node, particularly at the receiver thereof.

The processor of the second node is capable of providing different failure signals. As a first variant, the failure signal may be provided by generating one or more modified continuity check messages. Different from the cleared RDI field in a conventional continuity check message, the RDI field of the (modified) continuity check message may be set. The set RDI field can thus be used to signal the failure status of the primary tree.

The transmitter of the second node is configured to transmit the modified continuity check messages in a continuous manner. It may do so until the receiver of the second node again receives the (unmodified) continuity check messages originated from the first node on the primary tree.

As a second variant, the processor can provide the failure signal by generating a failure notification message which comprises an identification of the primary tree. Further, the processor can be configured to provide a reparation signal to be transmitted to the first node when the receiver of the second node again receives the (unmodified) continuity check messages originated from the first node on the primary tree. The reparation signal indicates a restored status of the primary tree. The processor can be configured to provide the reparation signal by generating a reparation notification message which comprises an identification of the primary tree.

The transmitter may be configured to transmit the reparation signal when a predetermined time interval has expired after a predetermined number of consecutive continuity check messages are received again at the receiver.

The first node may be further associated with a plurality of backup trees. When this is the case, the transmitter of the second node may be configured to transmit the failure signal on not only the primary tree but also all the backup trees that are operational. The plurality of backup trees may be grouped into one or more sets, and the transmitter of the second node may, upon detection of the failure of the primary tree, transmit the failure signal only on those backup trees belonging to the sets whose backup trees are all operational.

BRIEF DESCRIPTION OF THE DRAWINGS

In the following, the invention is further described with reference to the exemplary embodiments illustrated in the figures, in which.

DETAILED DESCRIPTION

Figure 1:
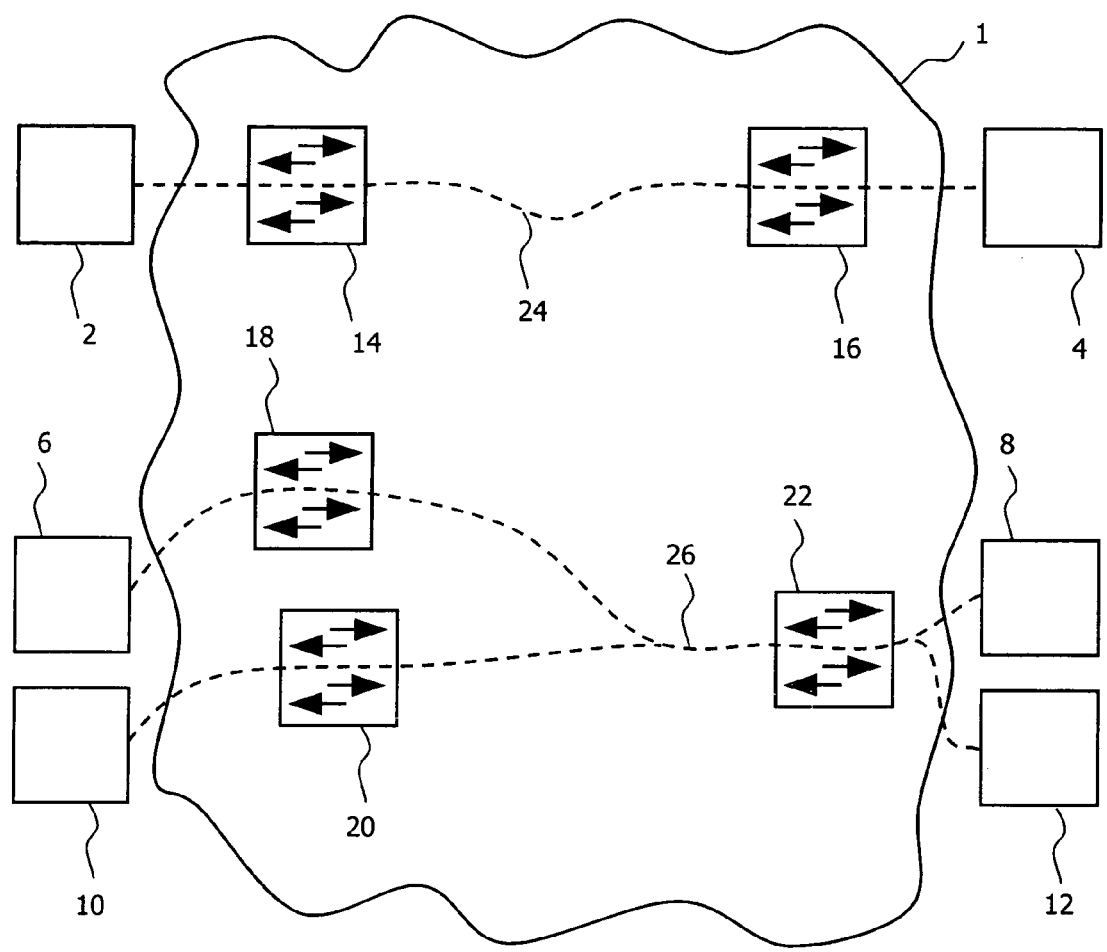
FIG. 1 is a block diagram illustrating a computer network capable of providing point-to-point and multipoint-to-multipoint services.

In the following, for purposes of explanation and not limitation, specific details are set forth in order to provide a thorough understanding of the invention. It will be apparent to those skilled in the art that the invention may be practiced in embodiments that depart from these specific details. For instance, although the exemplary embodiments are described in connection with an Ethernet network, they are equally applicable to other kinds of computer networks.

The invention facilitates the notification of the root node of a failure of the default path. For SPB-controlled networks, the invention can ensure the congruency of the forward and reverse paths. However, the use of the invention is not limited to SPB networks.

In the context of the application, the terms "continuity check message" can be any message that is designed for checking the connectivity/availability of data forwarding paths: It may be a CCM as defined in CFM, but it can also be a non CFM-message as long as it fulfils the connectivity checking purpose.

Those skilled in the art will further appreciate that the functions explained herein below may be implemented using hardware circuitry, software means, or a combination thereof. The software means may be in conjunction with a programmed micro-processor or a general purpose computer, using an Application Specific Integrated Circuit (ASIC) and/or Digital Signal Processors (DSPs). It will also be apparent that when the invention is described as a method, it may also be embodied in a computer processor and a memory coupled to the processor, wherein the memory is encoded with one or more programs that perform the method when executed by the processor.

The present disclosure provides various novel resiliency techniques that rely on various OAM implemented in a computer network. Furthermore, a standard control protocol is implemented in the network for the establishment and maintenance of the forwarding trees needed for multipoint services. The OAM is used for connectivity monitoring with as little extension as needed or without any extension. The present disclosure specifies the usage of the OAM and specifies the extensions to the control protocol in order to provide bounded failover. Particularly, IEEE 802.1aq is extended/modified in order to be able to provide controlled failover thus make available bounded failover for multipoint services.

For example, the present disclosure can be applied in Ethernet networks as they may implement IEEE 802.1ag CFM as OAM and IEEE 802.1aq SPB as the control protocol for the control of forwarding paths. Therefore, the details of the below embodiments are described for an IEEE 802.1aq controlled and IEEE 802.1ag monitored network in order to be able to explain the details of operation. However, the embodiments can be applied in any packet network that implements OAM for the connectivity monitoring of multipoint connections and a control protocol for the maintenance of forwarding trees for multipoint connections.

Firstly, to achieve the protection switching, Backup Trees are defined for the fault scenarios against which protection is desired. An arrangement is proposed for SPB where the Backup Trees are also computed and maintained besides the Primary Trees by the link state control protocol used in SPB. In addition to this, SPB is combined with CFM and use CCM frames for the monitoring of all Primary and Backup Trees. Furthermore, a protection switching mechanism is specified for the redirection of user traffic to unharmed Backup Trees in a coordinated manner if a failure occurs, which is not trivial taking into account the significant number of trees used in an SPB network. Thus, the proposed protection switching provides a bounded failover time for multipoint services, which is related to the CCM Interval of the CCM frames used for monitoring.

As a system overview, FIG. 1 depicts a computer network 1 capable of providing point-to-point as well as multipoint-to-multipoint services to a number of computers 2, 4, 6, 8, 10, and 12. A plurality of nodes 14, 16, 18, 20, and 22 are provided in the network 1. These nodes are capable of forwarding data between the computers as well as among themselves. For instance, in the upper part of the figure, the nodes 14 and 16 cooperate with each other to forward the data originated from computer 2 to computer 4 or vice versa. This is a typical point-to-point service. In the lower part of the figure, nodes 18, 20 and 22 cooperate with each other to forward data originated from two computers 6 and 10 to another two computers 8 and 12 or vice versa. This is a typical multipoint-to-multipoint service. The data forwarding paths are shown as dotted lines 24, 26. Depending upon the network configuration and the service types, the paths may be unicast or multicast. Physical entities constituting the paths include the respective nodes and links connecting the computers and the nodes as well as those connecting the nodes themselves. A link may be uni-directional or bi-directional. The computer network 1 may be controlled by the SPB protocol. In this case, for each node, at least one shortest path tree is calculated to be used by the node wherein the node itself forms the root of the tree; and for any pair of nodes, 14 and 16 for example, the unicast path from 14 to 16 is the exact reverse of the path from 16 to 14; and any multicast traffic between any two nodes, 20 and 22 for instance, follows the unicast path.

Figure 2:
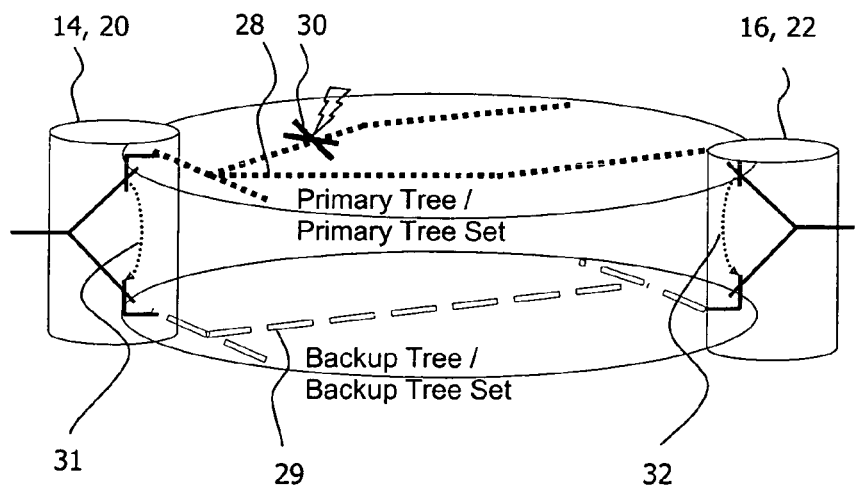
FIG. 2 is a block diagram showing a system embodiment wherein data form warding is switched from a primary tree (or a primary tree set) to a backup tree (or a backup tree set)

FIG. 2 shows a system embodiment of protection switching involving two nodes, 14 and 16 or 20 and 22. Particularly, FIG. 2 illustrates the scenario where the data forwarding from node 14 to node 16 or from node 20 to node 22 is switched from a primary tree 28 (or a primary tree set) to a backup tree 29 (or to a backup tree set). The primary tree 28 and a backup tree 29 are calculated for the source node 14 or 20 of the data forwarding, for example, using a shortest path tree computation algorithm. This means that node 14 or 20 is associated with the primary tree 28 and the backup tree 29. The primary tree 28 defines a default path for node 14 or 20 to forward data to node 16 or 22. The term "default" means that the primary tree is always used for data forwarding as long as it is operational. The backup tree 29, on the other hand, defines a different path for node 14 or 20 to forward data to node 16 or 22; this path is used as an alternative path for the data forwarding in case a failure occurs to the primary tree 28 such that data forwarding on the primary tree 28 is no longer possible. As shown in the figure, a failure event, denoted as the cross 30, occurs to the primary tree 28, e.g. the primary tree 28 is broken. Then, the data forwarding from node 14 or 20 to node 16 or 22 is switched from the primary tree 28 to the backup tree 29. The switching is indicated by the two arrows 31 and 32 at node 14 or 20 and 16 or 22, respectively.

1. Arrangement of Connections Supporting Multipoint Services

IEEE 802.1aq Shortest Path Bridging (SPB) may be used as a control protocol for the network. SPB maintains a Shortest Path Tree (SPT) for each node in the network, i.e. each node owns an SPT. The nodes only send data on their own trees, i.e. a node only uses its own tree for data forwarding. That is, the SPTs are source rooted and each node is only root on its own tree but a leaf in all other trees. Nodes supporting SPB, which are referred to as SPT nodes, form an SPT Region if their configuration matches, i.e. all nodes in the region are configured with compatible assignments to shortest path trees. Thus all nodes in an SPT Region agree which VLANs are shortest path connected and which SPT Set is used for each of those VLANs. SPT nodes use their own trees for data forwarding thus connectivity is provided by multiple SPTs.

The SPTs that support a service, i.e. used for the forwarding of data associated to that specific service, form the so called SPT Set, also referred to as Primary Set. For instance, if a VLAN is provided over the SPT Region and all nodes of the region participate in the VLAN, then the SPT Set corresponding to that VLAN comprises each SPT of the region. A VLAN is identified by the Base VID inside an SPT region. The SPTs are source rooted and either identified by an SPVID, which is referred to as Format A in SPB, or identified by the link layer address of the owner node (i.e. the source node) and a corresponding Nickname incorporated into Group MAC addresses, which is referred to as Format B in SPB. That is, the SPTs are unidirectional, data is only sent from the root node towards leaf nodes.

That is, a multipoint service is supported in an SPT Region by the VLAN configured for the multipoint service and the connectivity is provided by the SPT Set maintained for that VLAN.

As specified in SPB, an Alternate Set may be also used for a service in order to comprise equal cost paths not used in the Primary Set thus setting up Equal Cost Multiple Trees (ECMT), which can be used for load sharing.

Backup Trees are provided and maintained for Primary SPTs in order to provide protection for specific failure scenarios. If a network element breaks down, the data forwarding is redirected from the broken Primary SPTs to unharmed Backup Trees. Note that the Backup Trees are probably not SPTs as they need to be disjoint from the Primary SPTs. There may be a Backup Tree defined for an individual Primary SPT. An alternative to this is to group Primary SPTs into a Primary SPT Set and define Backup Tree Set(s) for fault protection. FIG. 2 illustrates a Primary SPT Set and a Backup Tree set maintained in an SPT Region. In case of a fault event, each node of the SPT Region switches to the appropriate Backup Tree Set and the edge nodes of the SPT Region redirect all traffic to the Backup Tree Set from the Primary SPT Set. Note that depending on the failure scenarios to be protected multiple Backup Trees or Backup Tree Sets may be provided, which depends on the physical topology of the network as well. Note also that load sharing may be applied between the Primary SPTs and Backup Trees meanwhile they are all operational. That is, load sharing can be applied despite of having a Backup Trees instead of an Alternate Set.

2. Tree Computation

The Backup Trees can be defined by using any algorithm that computes the trees in order to provide protection against the desired network element failure. The Backup Trees should be either completely or partially disjoint to the Primary Trees. Many algorithms can be used for the computation of disjoint trees. The most straightforward solution is to keep the shortest path trees for Primary Trees as computed and defined by IEEE 802.1aq and determine the backup trees aside the SPTs. The simplest method to determine Backup Trees might be the use of the very same algorithm that is used for the computation of the SPTs on the physical topology that does not involve the network elements against whose failure the protection is desired. Of course, the physical topology has to remain connected after taking out network elements, therefore, more backup trees might be needed for the protection of different network elements.

In other words, the main guiding principle for determining backup trees is that the backup tree should not comprise the network elements against whose failure the protection is desired for. That is, in case of protection against a specific link or node failure, Backup Trees should not include that specific link or node. For protection against any single link failure, for each network element there has to be a Backup Tree that does not comprise that network element. Note that the techniques proposed do not depend on the number and type of protected network elements, but only the type and the number of the Backup Trees needed. In case of an SPB network, each node owns a tree so each node has to have a tree that does not include the network element(s) against which the protection is required. More Backup Trees or Backup Tree Sets may be provided which are able to handle the very same failure event. Therefore, each node may run the very same algorithm to determine the Primary SPT Set and the Backup Tree Sets in order to have the very same tree set-up in each node thus able to provide connectivity through the network. Note that forward and reverse path congruency is essential for the proper operation of SPB, therefore, the Backup Trees have to be defined such that the congruency is maintained after switching to the Backup Trees.

Figure 18:
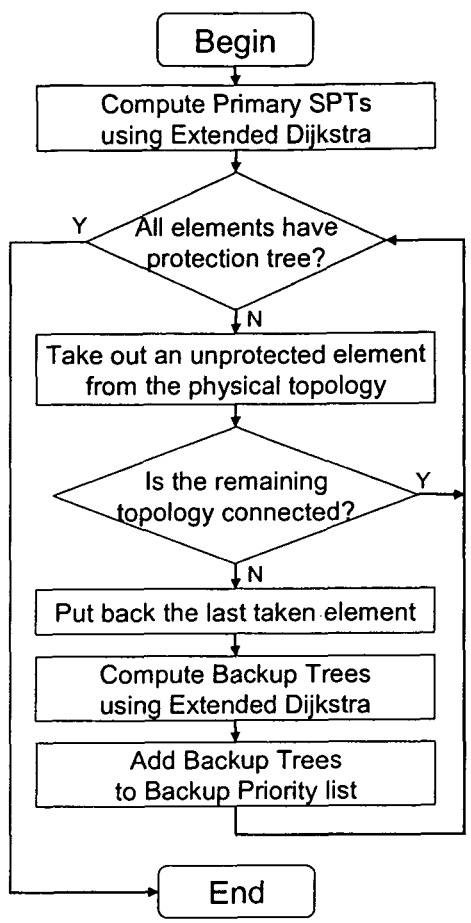
FIG. 18 is a flow chart illustrating a method embodiment used for tree computation.

Furthermore, the algorithm may determine a priority order among the Backup Trees or Backup Tree Sets and the very same priority order is maintained in each node. Thus, nodes switch to the higher priority Backup Tree or Backup Tree Set if more trees or sets could be selected, thus each node switches to the very same Backup Tree or Backup Tree Set. The Primary Set may be positioned at the top of the priority list. This way the Primary Trees are always used if they are unharmed, furthermore, the data from a broken Backup Tree in a load sharing scenario may be redirected to the Primary Tree. An example tree computation method is shown in FIG. 18. This method uses the Extended Dijkstra defined in SPB for SPT computation. This algorithm extends Dijkstra to provide tie-breaking for equal cost paths. It first computes the SPTs then determines the Backup Trees for the network elements aimed to be protected. Therefore, it takes out as many of these elements as possible in order to keep the physical topology connected and then invokes the Extended Dikstra computation. This way the Backup Trees provide the necessary congruency. Then it determines further Backup Trees by taking out other elements from the physical topology until all elements taken out once, i.e. there are Backup Trees for the failure of all elements.

3. Switching Alternatives

Two kind of switching can be implemented in an SPB network:

Tree Switching:

Only the affected Primary SPTs are switched to their corresponding Backup Trees in case of a failure event.

Set Switching:

The entire Primary SPT Set is switched to a Backup Tree Set in case of a failure event.

Thus the Backup Trees can be determined along two kinds of principles. The protection method is described in detail in Section 5 below. Furthermore, the two kind of switching have different requirements for CFM. CFM can be applied for Set Switching as it is specified today, however, some extensions are needed for the Tree Switching approach, which are described within the protection method in Section 5 below in detail.

Figure 3:
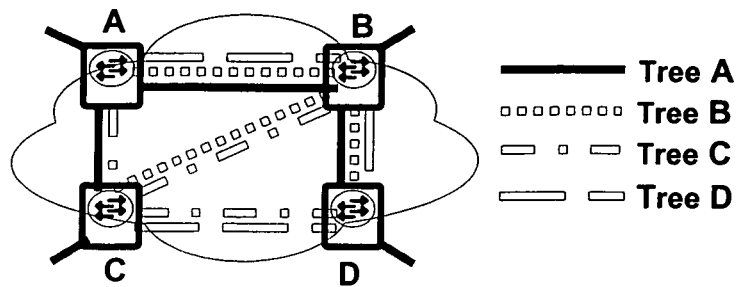
FIG. 3 is a block diagram illustrating a shortest path tree comprised in a primary tree set.

FIG. 3 shows a Primary SPT Set in an SPT Region in an example network scenario.

Figure 4:
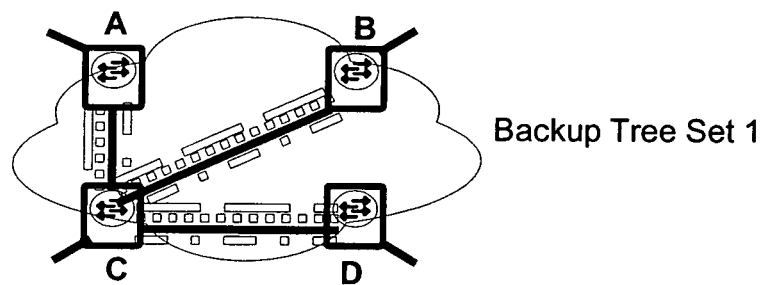
FIG. 4 are three block diagrams each showing a backup tree set as alternative for the primary tree set of FIG. 3 determined for set switching.
Figure 4:
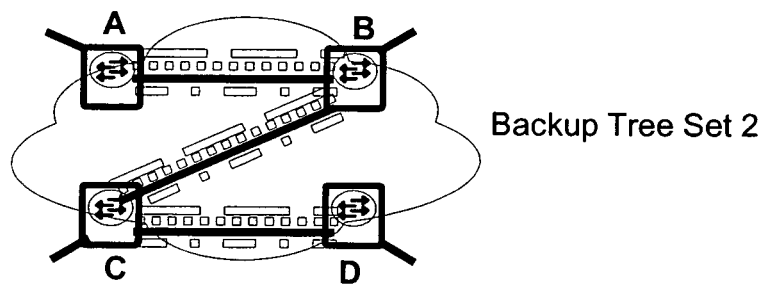
Figure 4:
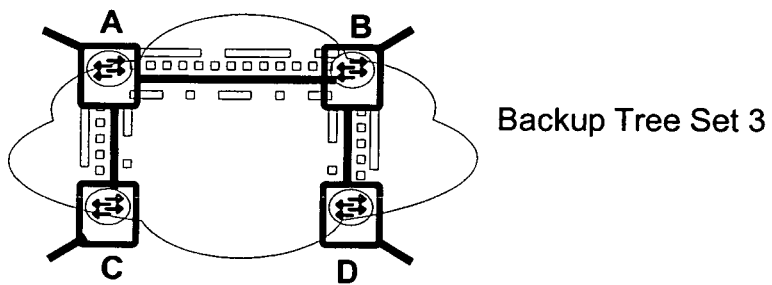

A possible set-up for Backup Tree Sets is depicted in FIG. 4, which is determined in order to avoid any single failure (either link or node failure) if Set Switching is applied, i.e. all trees are switched to the Backup Tree Set in case of a failure event, even the trees not affected by the failure. For example, if the link between Node B and Node D goes down, then all traffic is redirected from the Primary SPT Set to Backup Tree Set 1. Note that Backup Tree Set 2 would be also able to handle this failure event but nodes switch to Backup Tree Set 1 as it has a higher priority. Note that switching to unharmed trees may only cause traffic outage for a short time, i.e. for the switching time itself. However, by switching unaffected trees reroutes unaffected traffic from its shortest path, though Set Switching can be implemented without modifications to current CFM.

Figure 5:
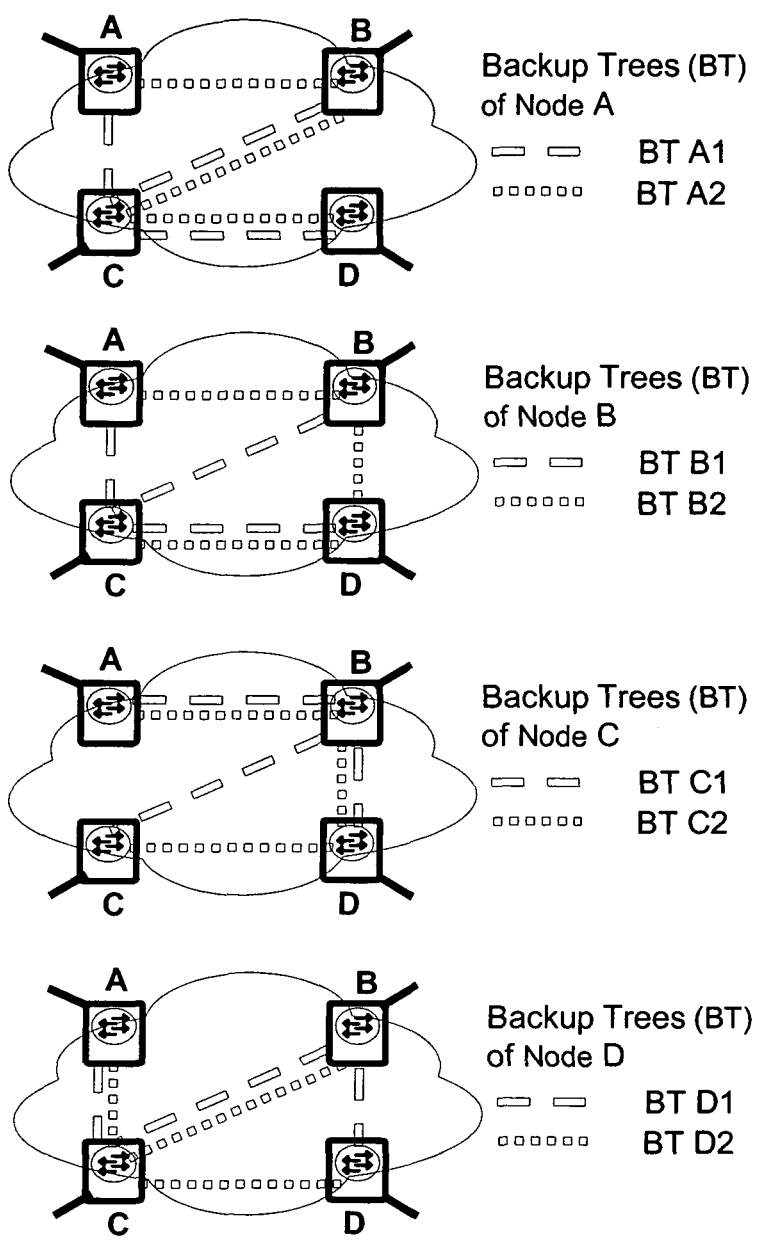
FIG. 5 includes four block diagrams each showing a backup tree for the primary tree set of FIG. 3 determined for tree switching.

FIG. 5 shows Backup Trees determined one by one for the SPTs of the nodes shown in FIG. 3, thus they support the Tree Switching approach. That is, the affected trees are only switched to backup trees in case of a failure event. The SPTs not affected by a failure are not switched to any Backup Tree. The appropriate Backup Tree should be selected for the SPTs affected such that the forward and reverse path congruency is maintained. This approach may be implemented by not maintaining the Tree Sets for the Backup Trees as the SPT Sets and the Alternate Sets maintained in IEEE 802.1aq but rather maintaining the Backup Trees for each specific SPT. Having the same example as in the previous approach, i.e. the failure of the link between node B and node D, SPT C is not affected by the failure so it is not switched over. However, all other SPTs are affected so they are switched to an appropriate Backup Tree. That is SPT A is switched to BT A2, SPT B is switched to BT B2 and SPT D is switched to BT D2. Another failure example is the breakdown of the link between node B and node C, where only SPT B is switched to BT B2 and SPT C is switched to BT C2. By the Tree Switching approach, the traffic forwarded as long unaffected trees is not disturbed, however, appropriate Backup Trees must be carefully selected.

If Set Switching is applied, it is proposed to assign a different Backup-BaseVID to each Backup Tree Set besides the BaseVID assigned to the Primary SPT Set. Thus the Tree Sets are identified and can be distinguished by their Base VID. Thus the Primary Tree Set is identified by the Base VID and a Backup Tree Set is identified by a Backup-BaseVID.

In order to be able to monitor and to be able to use immediately after protection switching, the forwarding of all Backup Trees has to be maintained besides the SPTs. That is, the filtering entries have to be maintained for the Backup Trees as well. It is proposed to give priority to compute and set the Primary Trees over the Backup trees if computation is needed thus shortening the restoration time of the primary trees.

4. Connectivity Monitoring

In order to be able to detect failures and to be able to select unharmed Backup Trees, the availability of the trees should to be monitored. Continuity Check Messages (CCM) defined in CFM may be used for the monitoring of the trees.

CCM messages may be used for the connectivity monitoring of each tree individually, i.e. for all SPTs of the Primary SPT Set and all trees of each Backup Tree Set. Therefore, a Maintenance Association (MA) may be set for each tree individually. This can be done for both Format A and Format B defined in SPB and for all tree sets, i.e. for the Primary SPT set and for all Backup Tree Sets irrespective of how the Backup Trees are grouped into sets.

That is, the root node of a tree, which is the only source node of the tree, sends CCM messages periodically in order to monitor the connectivity of the tree. The CCMs are received at every other node, thus by each edge node of the SPT region as well. If any of the edge nodes detects a missing CCM on a tree, protection switching is invoked in order to switch to available Backup Trees. The protection switching is described in the next section in detail.

Note that the CCM Interval, which is the time elapsed between sending two consecutive CCM messages or frames, determines the achievable failover time. In order to provide 50 ms failover time the CCM Interval should be equal to or lower than 20 ms, preferably 10 ms.

The CCMs can be used for connectivity monitoring in both Set Switching and Tree Switching approaches.

Figure 6:
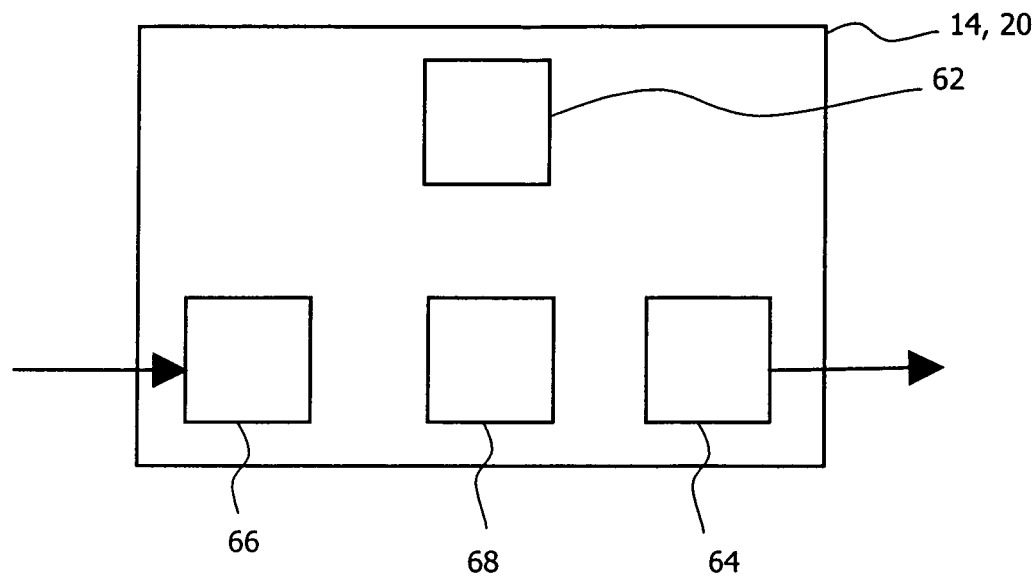
FIG. 6 is a block diagram showing a first embodiment of a node for forwarding data in a computer network.

To implement the protection switching, different embodiments of nodes are provided. FIG. 6 depicts a first node embodiment which can be viewed as a source node perspective. Accordingly, this node embodiment corresponds to node 14 or 20 in FIGS. 1 and 2. As shown in FIG. 6, the node 14 or 20 comprises the following components: a processor 62 configured to associate the node 14 or 20 with a primary tree 28 and backup tree 29, wherein the primary tree 28 defines a default path for the node 14 to forward data to another node, e.g. node 16 or 22 in FIGS. 1 and 2 while the backup tree 29 defines another path for the data forwarding which is to be used in case of a failure of the primary tree 28. The node embodiment further comprises a transmitter 64 configured to transmit one or more continuity check messages on the primary tree 28 as well as the backup tree 29. Further, the node 14 or 20 comprises a receiver 66 configured to receive a failure signal transmitted from the node 16 or 22. The failure signal may be transmitted on the backup tree 29. Further, the node 14 or 20 comprises a detector 68 configured to detect occurrence of a failure of the primary tree 28. The detector 68 detects the failure occurrence based on receipt of a failure signal transmitted from the second node wherein the failure signal indicates a failure status of the primary tree 28. Upon detection of the failure of the primary tree 28, the processor 62 switches the forwarding of data from the primary tree 28 to the backup tree 29. Although the processor 62 and the detector 68 are depicted in FIG. 6 as separate components, they may be integrated physically or logically in real implementations of the node 14 or 20.

Figure 7:
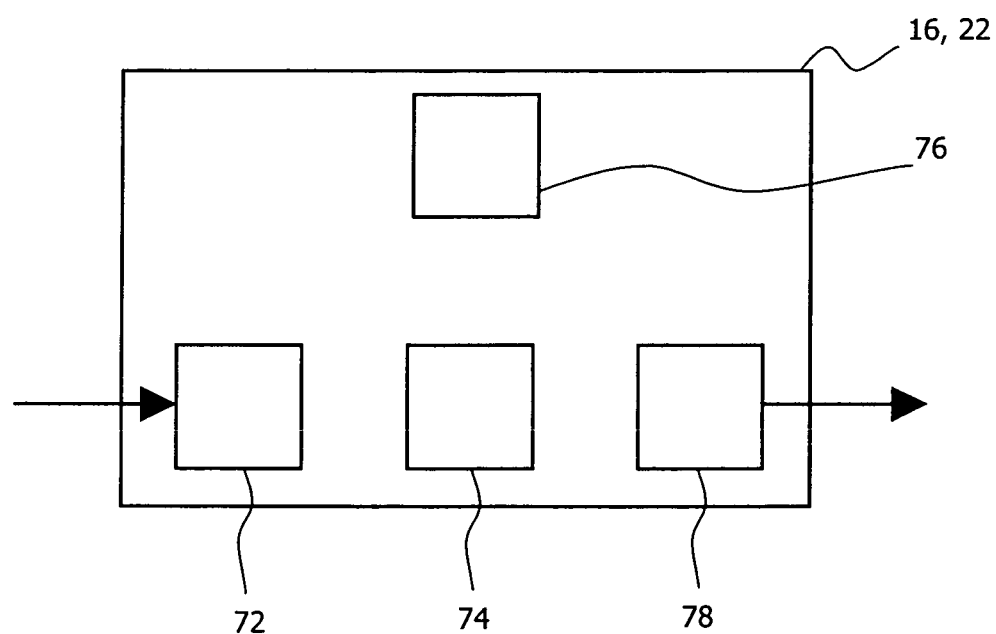
FIG. 7 is a block diagram showing a second embodiment of the node.

Referring to FIG. 7, another node embodiment is provided to implement the protective switching. This embodiment is designed from the perspective of a destination node, such as the node 16 or 22 shown in FIGS. 1 and 2. Node 16 or 22 is configured to receive data forwarded from node 14 or 20, which is associated with a primary tree 28 and a backup tree 29. As mentioned above, the primary tree 28 defines a default path for node 14 or 20 to forward data to node 16 or 22 while the backup tree 29 defines another path determined for data forwarding in case of a failure of the primary tree 28. Node 16 or 22 comprises a receiver 72 configured to receive one or more continuity check messages transmitted on the primary tree 28 from node 14 or 20. Node 16 or 22 further comprises a detector 74 which can detect occurrence of a failure of the primary tree 28. The detector 74 determines that a failure has occurred on the primary tree 28 when at least one continuity check message transmitted from node 14 or 20 on the primary tree 28 is not received at the receiver 72. Further, node 16 or 22 comprises a processor 76 which is configured to, among others, notify node 14 or 20 about the failure of the primary tree 28 once the failure has been detected. To this end, the processor 76 may provide a failure signal indicating a failure status of the primary tree. Further, node 16 or 22 comprises a transmitter 78 for transmitting the failure signal to the node 14 or 20. The failure signal may be transmitted on the backup tree 29. the processor 76 and the detector 74 may be implemented as separate components or integrated together.

Figure 8:
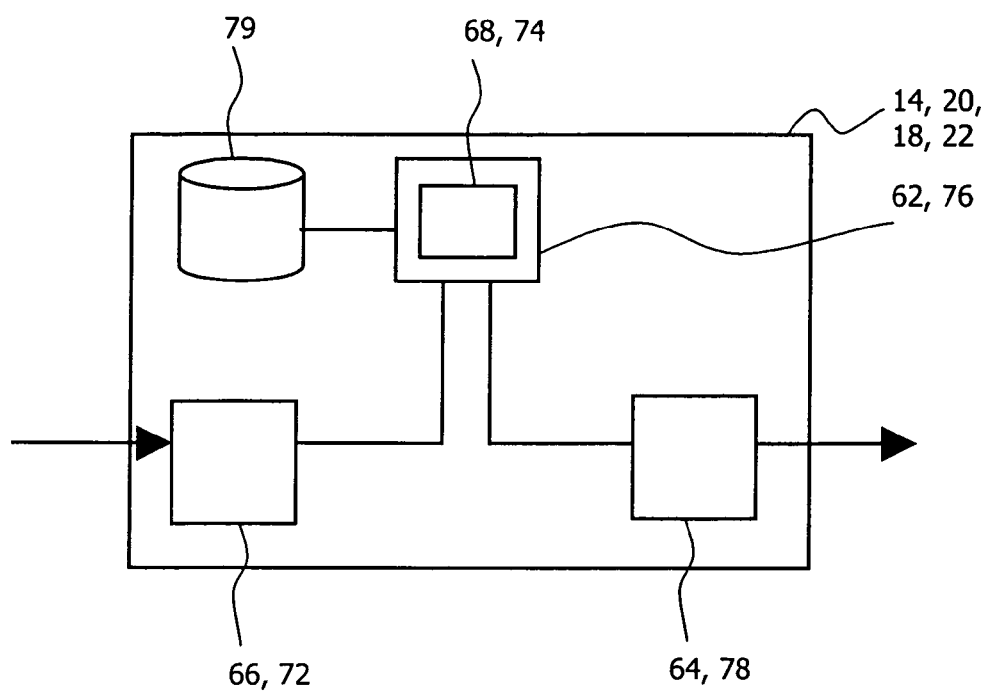
FIG. 8 is a block diagram showing a further embodiment of the node.

FIG. 8 shows a further node embodiment capable of implementing protection switching. The node can serve either as a source node such as node 14 or 20 shown in FIGS. 1 and 2 or a destination node such as node 16 or 22. The node has a memory 79 which stores the Primary SPT Set and all the Backup Tree Sets, and furthermore, stores the priority list of tree sets and the list of broken trees. A processor, corresponding to the processor 62 or 76 shown in FIGS. 6 and 7 is provided for the computation of all primary and backup trees and for invoking the steps required for the protection method. A receiver corresponding to the receiver 66 or 72 shown in FIGS. 6 and 7 is provided for receiving connectivity fault management signals instructing the node to invoke certain parts of the protection method. A transmitter corresponding to the transmitter 64 or 78 as shown in FIGS. 6 and 7, is provided for issuing and forwarding connectivity fault management signals to other nodes. The detector 68 or 74 may be integrated with the processor 68 or 74. The detection is capable of detesting a failure of the primary tree as described for FIGS. 6 and 7 above.

Figure 9:
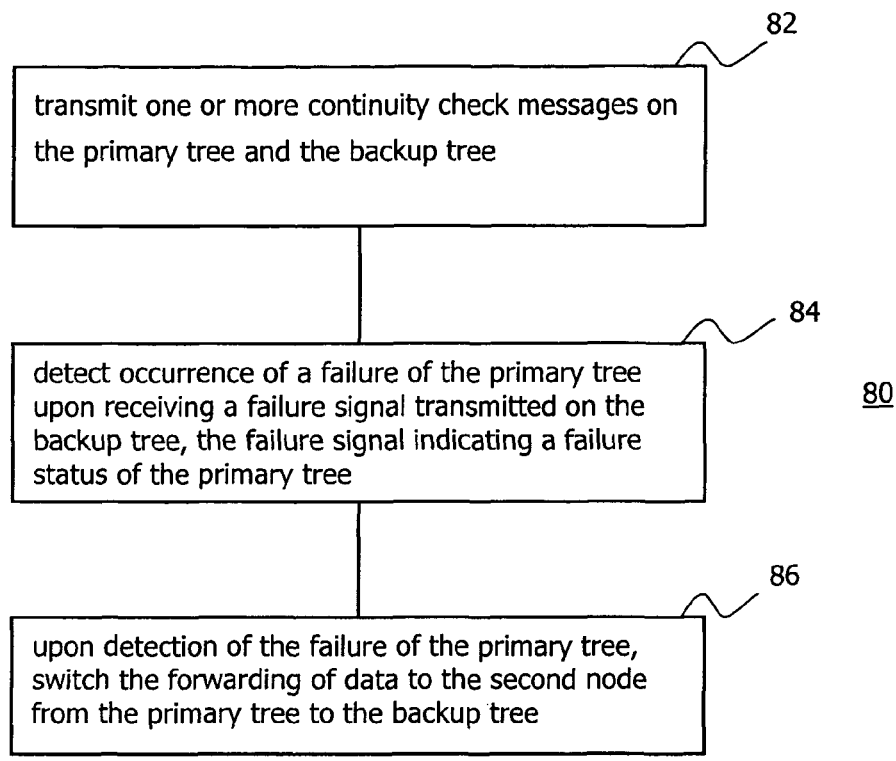
FIG. 9 is a flow chart illustrating a first method embodiment.

Corresponding to the source and destination node embodiments described above, two method embodiments are provided as illustrated in FIG. 8 and FIG. 9, respectively. Referring to FIG. 8, a first method embodiment 80 for controlling forwarding of data in a computer network is provided. The network, such as the network 1 as explained in FIG. 1, comprises a set of nodes for forwarding data. A first node, for example node 14 or node 20 referred to in FIGS. 1 and 2, is associated with a primary tree 28 and a backup tree 29 defining a default path and a backup path respectively for the first node 14 or 20 to forward data to a second node 16 or 22. The backup tree 29 is used in case of a failure of the primary tree 28. The method 80 comprises to the following steps performed by the first node 14 or 20: At step 82, one or more continuity check messages are transmitted on the primary tree as well as the backup tree. At step 84, a failure of the primary tree may be detected if a failure signal transmitted from the second node 16 or 22 is received; the failure signal indicates a failure status of the primary tree 28 Then, at step 86, upon detection of the failure of the primary tree 28, the first node 14 or 20 switches the forwarding of data from the primary tree 28 to the backup tree 29.

Figure 10:
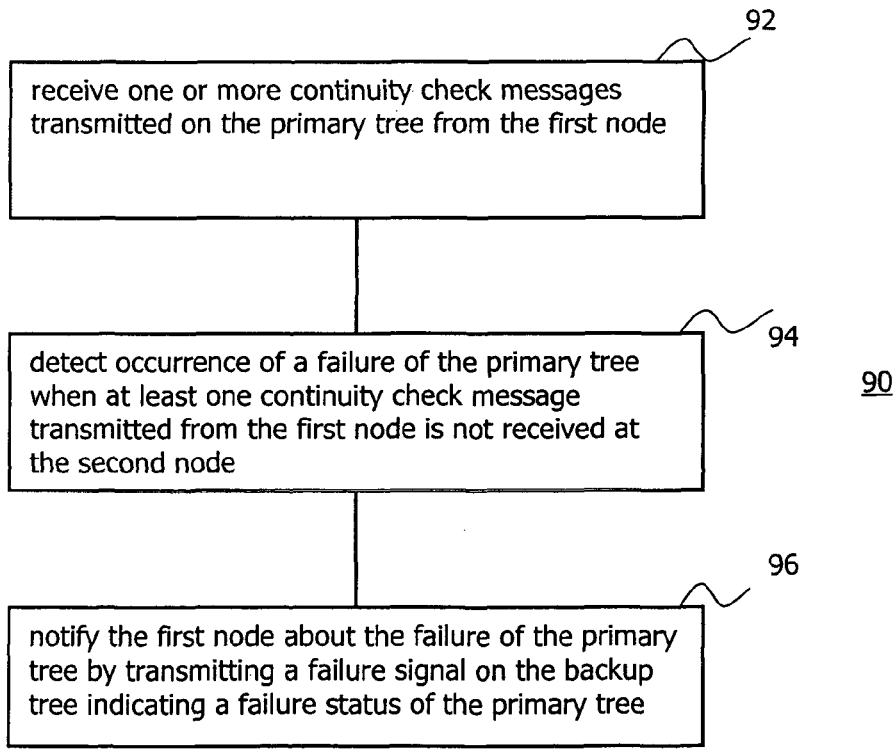
FIG. 10 is another flow chart illustrating a second method embodiment.

The second method embodiment 90 is depicted in FIG. 10. Method 90 can be carried out in a similar network scenario as method 80. Method 90 is, however, performed from the perspective of a destination node, such as node 16 or 22 referred to in FIGS. 1 and 2. Method 90 comprises the following steps: At step 92, one or more continuity check messages are transmitted on the primary tree from the first node 14 or 20. At step 84, a failure of the primary tree is detected whereas the detection is determined when at least one continuity check message transmitted from the first node 14 or 20 is not received at the second node 16 or 22. Then, at step 86, the first node 14 or 20 is notified about the failure of the primary tree 28 by the second node 16 or 22; to do so, the second node transmits a failure signal to the first node wherein the failure signal indicates a failure status of the primary tree 28.

5. Protection Switching

With respect to FIGS. 11 to 17, more method embodiments are provided to implement the protection switching.

As described in the above, a failure of a tree may be detected by means of missing CCM messages.

If an edge node does not receive a CCM from the root node of a tree then the edge node assumes that a failure has occurred and the tree is broken. This tree can be an SPT or a Backup Tree. It is likely that the failure of a network element breaks down multiple trees. Furthermore, it is likely that the failure of a network element is only detected by a few of the edge nodes. In addition, if the trees are unidirectional the root nodes can be only notified on other tree(s) about the occurrence of a failure.

The proposed notification and switching mechanism is different for the Set Switching and the Tree Switching approaches. However, the protection method can be used both in revertive and non-revertive modes in both switching approaches. Furthermore, the switching to backup trees can be combined with the restoration mechanism already applied in SPB, i.e. with the recomputation of trees after any change in the topology, which change may be a failure event for instance.

5.1 Tree Switching

The main difference between Tree Switching and Set Switching is that the Backup Trees are not grouped i.e. not administrated together in Tree Switching but there are individual Backup Trees for individual SPTs. Therefore, the coordination of switching to Backup Trees is a complex in order to maintain the congruency requirement of SPB.

For Tree Switching it is essential for the nodes to become aware which of their trees are broken and which ones are operational. As there are source rooted unidirectional trees in SPB nodes cannot determine which of their trees are broken. This problem can be solved basically in two manners according to the two embodiments below:

Reverse Monitoring: The reverse path is monitored not only the forward path.

Explicit Notification: The node that detects a failure informs all other nodes on which trees are broken.

The two embodiments require different protection methods, which are described in detail in the following.

5.1.1 Reverse Monitoring

In order to inform the source node on which trees are available the reverse path has to be monitored besides the forward path. It is not that problematic for those trees that belong to bidirectional services as both the forward and reverse paths are established in order to support bidirectional services. In order to maintain the congruency the nodes should switch to Backup Trees in a coordinated manner. As mentioned in Section 3 above, the Backup Trees should be determined by an algorithm such that Backup Trees also support the forward and reverse path congruency. Therefore, if there are Backup Trees maintained to protect against a failure and they support congruency, then nodes are able to switch to proper Backup Trees. There may be multiple Backup Trees that are able to handle the very same failure event(s), therefore, the nodes may obtain and maintain a priority order for the Backup Trees and switch to the highest priority Backup Tree. The priority list can be determined by using a tie-breaking rule, e.g. the ordered list of node IDs comprising a tree. As already mentioned before, all Primary and Backup Trees are always monitored by CCM messages.

However, the reverse path may not be maintained for a point-to-multipoint service by IS-IS in SPB, e.g. for a multicast service where there is a single data source and multiple destinations. If a tree exists in support of such a service then a so-called reverse tree should be maintained for the monitoring of that tree; that is, IS-IS should maintain the forwarding according to the reverse tree as well. The reverse tree comprises the same links and nodes as its forward counterpart but the reverse tree is a destination rooted tree. That is, the leaf nodes send CCMs to the root node of the tree in order to monitor the paths comprised in the tree. Thus the root node is aware of whether its tree is operational or not. Even more, the root node also knows which branch becomes broken, i.e. which leaf is not reachable.

Figure 11:
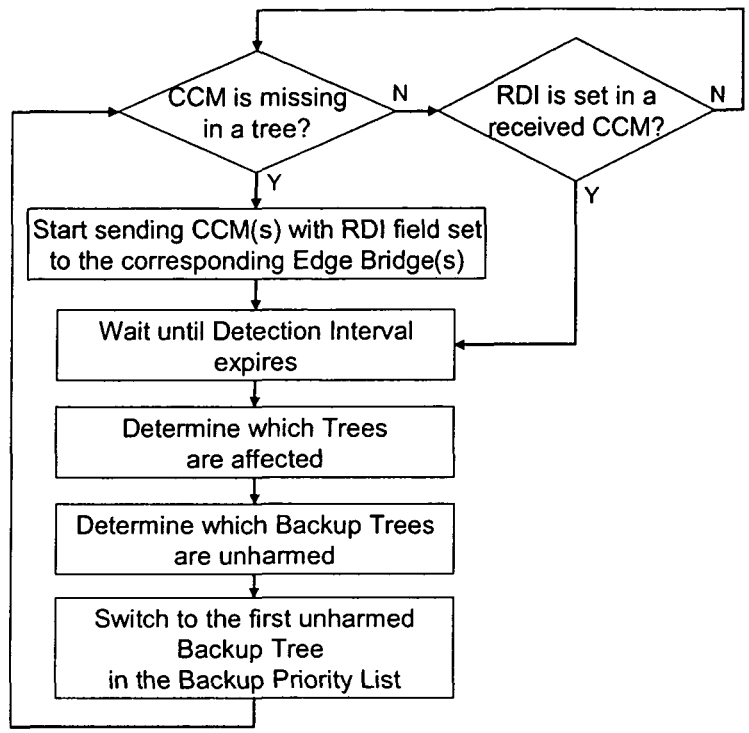
FIG. 11 is a flow chart depicting a further method embodiment involving tree switching with reverse monitoring applied.

The protection method for the Tree Switching approach with Reverse Monitoring is shown in FIG. 11. The method is the same both for the bidirectional and for the unidirectional case with reverse tree maintained. The only difference is that different CCMs indicate the breakdown of a tree. CFM is not needed to be modified for the Tree Switching approach if Reverse Monitoring is applied, only CCMs applied for monitoring but no notification is applied. If a failure happens, then CCMs are not transmitted on the broken element in neither directions. That is, CCMs are missing in both trees of a bidirectional connection and both on the forward and reverse tree in case of a unidirectional connection. Thus based on the missing CCMs edge nodes are able to determine which trees are broken and which trees are unharmed because each node is aware of the entire physical topology and is able to determine correlations between physical links and trees. Furthermore, each node is able to determine all other nodes' trees if it is necessary. That is, edge nodes simply switch to unharmed trees after the detection of a breakdown as shown in FIG. 11. Edge nodes switch to corresponding trees after a failure event as they compute the Backup Trees using the very same algorithm and maintain the very same priority table for the trees.

It may happen that only one direction of a link goes down. Therefore, if a CCM is missing the source edge node of the missing CCM has to be notified. Hence the detector edge node immediately sends and keeps sending CCMs with the RDI field set on its tree that is involves the path corresponding to the missing CCM until it receives again the missing CCM. That is, if a CCM is missing e.g. on a Primary Tree then CCMs with RDI field set are sent on the Primary Tree to the originator of the missing CCM. Thus the source node becomes aware of the failure and can invoke the proper switching.

A small hold-off time maybe applied, e.g. as the so-called Detection Interval in FIG. 11, in order to increase the probability that all missing CCMs are detected before switching thus increase the probability that a single switching is invoked, furthermore, in order to minimize the time interval for asymmetry in forward and reverse paths due to asynchronous switching.

Figure 12:
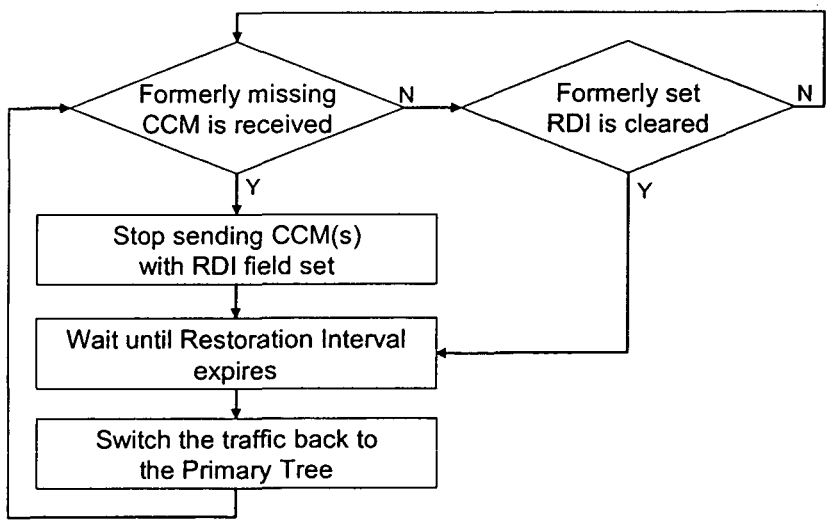
FIG. 12 is a flow chart depicting another method embodiment involving tree switching with reverse monitoring applied.

Te redirection method is shown in FIG. 12 for the case of revertive operation. If the failure is restored, then the formerly missing CCMs received again or the CCMs with RDI field are not received any more thus the data may be redirected to the Primary Trees. RDI fields of CCMs are also cleared. A hold-off timer maybe applied before redirection for robustness, e.g. as the so-called Restoration Interval in FIG. 12.

5.1.2 Explicit Notification

Extensions are needed for CFM in order to implement the operation of this embodiment. Two new message types are proposed: Failure Notification and Reparation Notification, which can be implemented either as new CFM messages or as new TLVs to conventional CCM messages. Both Failure and Reparation Notification messages contain the ID of the tree that has been broken or repaired, respectively. Both notification messages are broadcasted to all other nodes. As there are explicit notification messages the RDI field is not needed to be used in this approach.

Figure 13:
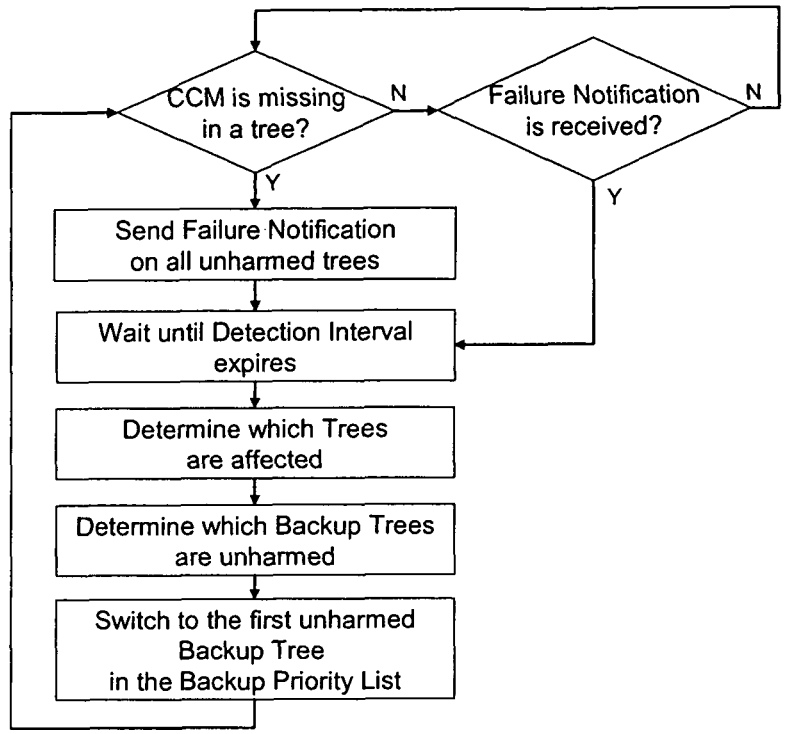
FIG. 13 is a flow chart depicting a further method embodiment involving tree switching with explicit notification applied.

Tree Switching is applied in this method but it is not absolutely necessary to maintain the reverse path in this method. The operation of this protection method is shown in FIG. 13. If a CCM is missing, the node that detects it sends one or more, e.g. three Notification Messages containing the ID of the broken tree on all unharmed trees. Thus every other node becomes aware of the failure and able to redirect traffic to the Backup Trees. The priority list for the trees is maintained in this method too in order to assure that congruency is maintained after traffic redirection. The waiting timers described above maybe also applied in this method for increased robustness.

Figure 14:
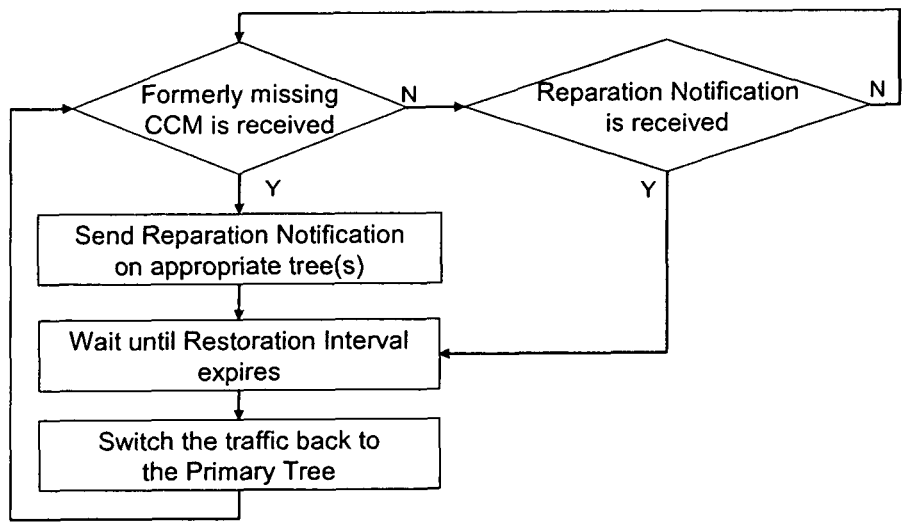
FIG. 14 is a flow chart depicting another method embodiment involving tree switching with explicit notification applied.

This approach can be also used in revertive mode. The redirection method is depicted in FIG. 14. If a tree is repaired or restored, then formerly missing CCMs arrive again. Thus, the node that receives these CCMs sends a Reparation Notification on the tree currently being used, which is probably a Backup Tree. Timers for robustness maybe applied in this method as well.

5.2 Set Switching

Figure 15:
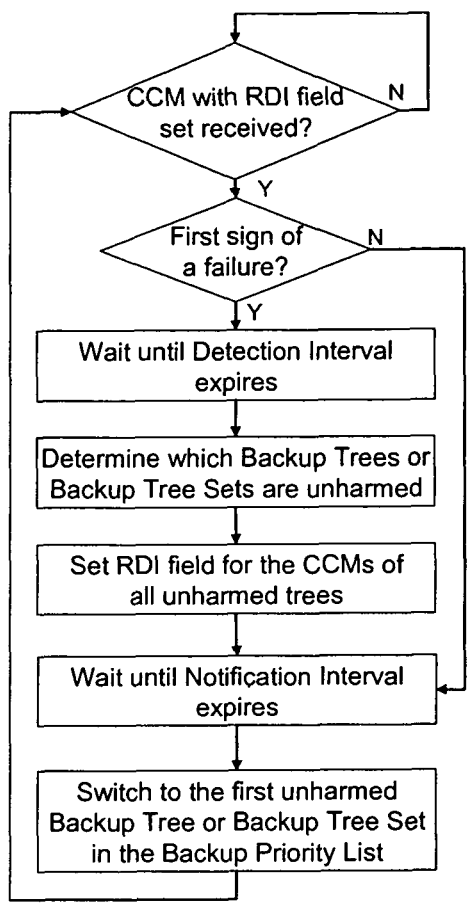
FIG. 15 is a flow chart depicting a further method embodiment involving set switching.

FIG. 15 shows the operation of the protection method for the Set Switching approach at an edge node detecting a missing CCM. Note that multiple consecutive missing CCMs could be waited if false reaction due to a single CCM loss is to be avoided. The missing CCM indicates a failure somewhere in the network. Before any reaction the edge node waits the so called Detection Interval, which is a fraction of the CCM Interval. Thus other tree breakdowns can be also detected. After the expiration of the Detection Interval, the edge node determines which trees are not affected, i.e. on which trees the CCMs from other nodes were received. The edge node then sets the RDI field for the CCMs sent on all unharmed trees. This way the edge node notifies other nodes that a failure occurred and switching is needed to Backup Trees. In addition, the RDI field of CCMs shows which trees are considered unharmed by the sender edge node as they are only sent on unharmed trees. Then the edge node waits until the so-called Notification Interval expires. During the Notification Interval each edge node sends CCMs with RDI field set according to their detections of broken trees, thus each node is notified on the fault event and also. Furthermore, each node is able to determine which are the unharmed trees, namely the trees on which the CCMs with RDI field received from each edge node. Having the information of the unharmed trees the unharmed Backup Tree Sets can be also determined. Edge nodes then switch user traffic to the Backup Tree Set that has the highest priority in the priority list among unharmed tree sets.

Figure 16:
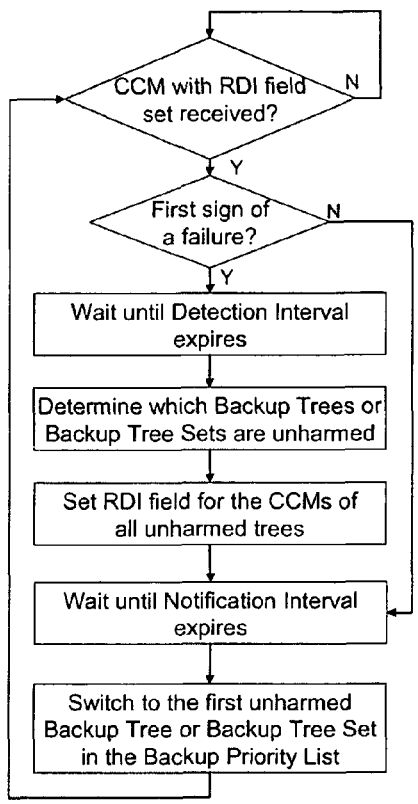
FIG. 16 is a flow chart depicting another method embodiment involving set switching.

The operation at an edge node when a CCM with an RDI field is set is depicted in FIG. 16. If such a CCM is received then it indicates that a failure has happened somewhere in the network. If this is the only notification on that a failure happened then the same steps are invoked as when detecting a failure based on a missing CCM. Nonetheless, if the edge node is aware of that some failure happened due to a missing CCM or another CCM with RDI field received, then the edge node waits the expiration of the Notification Interval thus it gets notified about which trees are unharmed. The edge node then switches user traffic to the highest priority Backup Tree Set.

Switching form a tree to another one means the replacement of SPVIDs of which the user frames tagged within the SPT Region. Thus for instance in case of a Format B SPBB region the frames are tagged with the Backup-BaseVID of the highest priority unharmed Backup Tree Set if it can be assumed that the Backup Tree Sets are determined and maintained for Set Switching as illustrated in FIG. 4.

Figure 17:
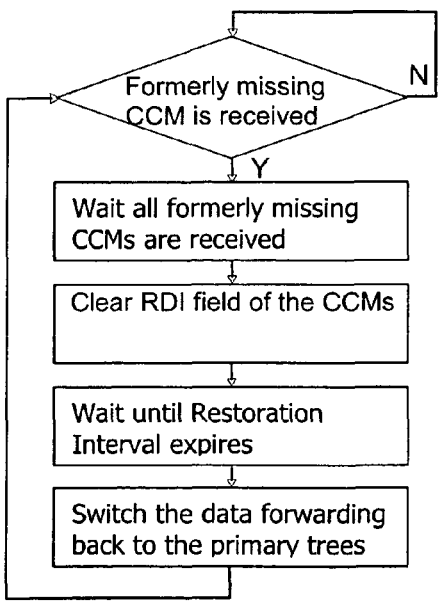
FIG. 17 is a flow chart depicting yet another method embodiment involving set switching.

Both revertive and non-revertive switching can be implemented with the proposed Set Switching approach. In the revertive case user traffic is switched back to the shortest path trees as soon as they are restored as depicted in FIG. 17. Edge nodes keep a record on which trees broke down due to a failure. Thus edge nodes are able to detect if CCMs are received again on a formerly broken tree. The appearance of such a CCM indicates that a restoration or reparation process is going on. The edge node then waits until it receives CCMs on each formerly broken tree and a little hold-off time for safety called Restoration Interval in order to make sure that all other edge nodes are aware of the restoration. The edge node then switches user traffic back to their primary trees. Note that the Restoration Interval should be set to a value within which the recomputation and reconfiguration of all SPTs surely done. A long Restoration Interval does not cause any problem as it only determines when to redirect the traffic from the backup path to the primary path, i.e. the switching from an operational path to another operational path. For the reduction of the restoration of the primary SPTs it is proposed that the primary SPTs should be recalculated and set after a topology change before any computation of Backup Trees adapted to the change is invoked.

The proposed protection switching as described in the above embodiments provides controlled failover for multipoint services in an Ethernet network controlled by SPB. CFM is used for connectivity monitoring. The primary paths are controlled by SPB. Further provided are advantageous arrangements of Backup Trees and new protection switching mechanisms, which are extensions to current SPB and can be fit into the standard. Further proposed is the application manner of CFM needed for the coordinated switchover of trees in case of a failure or a repair event. Thus the proposed technique makes 50 ms failover time achievable for multipoint services over an Ethernet network.

Those skilled in the art will further appreciate that the functions explained herein is below may be implemented using hardware circuitry, software means, or a combination thereof. The software means may be in conjunction with a programmed microprocessor or a general purpose computer, using an Application Specific Integrated Circuit (ASIC) and/or Digital Signal Processor (DSPs). It will also be apparent that when the invention is described as a method, it may also be embodied in a computer processor and a memory coupled to the processor, wherein the memory is encoded with one or more programs that perform the method when executed by the processor.

While the invention has been described with reference to the above embodiments, it is to be understood that the description is for illustration purposes only. Accordingly, it is intended that the invention be limited only by the scope of the claims appended hereto.

The invention claimed is:

1. A method for controlling forwarding of data in a computer network, wherein the network comprises a set of nodes for forwarding data, wherein a first node is associated with a primary tree and a plurality of backup trees, wherein the primary tree defines a default path for the first node to forward data to a second node and the backup trees define other paths for the first node to forward data to the second node in case of a failure of the primary tree, wherein each of the plurality of backup trees is grouped into a backup-tree set with one or more other trees used respectively by one or more other nodes of the network as backup trees for forwarding data, the method comprising the first node:
    transmitting one or more continuity check messages on the primary tree and the backup trees;
    detecting occurrence of a failure of the primary tree upon receiving a failure signal transmitted from the second node, wherein the failure signal indicates a failure status of the primary tree;
    obtaining priority information of the backup-tree sets;
    switching, in response to detection of the failure of the primary tree, the forwarding of data to the second node from the primary tree to a first backup tree comprised within a backup-tree set comprising trees that are all usable by their respective nodes to simultaneously avoid the failure, wherein the switching the forwarding of data to the second node from the primary tree to a first backup tree comprises switching the forwarding of data to the second node from the primary tree to a first backup tree based on the priority information.

2. The method of claim 1 wherein the failure signal comprises one or more modified continuity check messages comprising a Remote Defect Indication field indicating the failure status of the primary tree.

3. The method of claim 2 further comprising switching the forwarding of data back to the primary tree when the first node ceases to receive the modified continuity check messages indicating failure of the primary tree.

4. The method of claim 1 wherein the failure signal comprises a failure notification message comprising an identification of the primary tree.

5. The method of claim 4 wherein the failure notification message is either a message conforming to the Ethernet Connectivity Fault Management format or is comprised in a continuity check message as a type length value.

6. The method of claim 4 further comprising switching the forwarding of data back to the primary tree upon receiving a reparation signal transmitted by the second node, wherein the reparation signal indicates a restored status of the primary tree.

7. The method of claim 6 wherein the reparation signal comprises a reparation notification message comprising an identification of the primary tree.

8. The method of claim 6 wherein the reparation notification message is either a message conforming to the Ethernet Connectivity Fault Management format or is comprised in a continuity check message as a type length value.

9. The method of claim 1 further comprising providing the backup trees by using a same tree calculation algorithm as the primary tree but excluding a network component causing the failure of the primary tree.

10. A computer program product stored in a non-transient computer readable medium for controlling forwarding of data in a computer network, wherein the network comprises a set of nodes for forwarding data, wherein a first node is associated with a primary tree and a plurality of backup trees, wherein the primary tree defines a default path for the first node to forward data to a second node and the backup trees define other paths for the first node to forward data to the second node in case of a failure of the primary tree, wherein each of the plurality of backup trees is grouped into a backup-tree set with one or more other trees used respectively by one or more other nodes of the network as backup trees for forwarding data, the computer program product comprising software code instructions which, when run on the first node, causes the first node to:
 transmit one or more continuity check messages on the primary tree and the backup trees;
 detect occurrence of a failure of the primary tree upon receiving a failure signal transmitted from the second node, wherein the failure signal indicates a failure status of the primary tree;
 obtain priority information of the backup-tree sets;
 switch, in response to detection of the failure of the primary tree, the forwarding of data to the second node from the primary tree to a first backup tree comprised within a backup-tree set comprising trees that are all usable by their respective nodes to simultaneously avoid the failure, wherein the switching the forwarding of data to the second node from the primary tree to a first backup tree comprises switching the forwarding of data to the second node from the primary tree to a first backup tree based on the priority information.

11. A first node for a computer network, the first node configured to forward data to another second node in the network, the first node comprising:
 one or more processing circuits configured to:
  associate the first node with a primary tree and a plurality of backup trees, wherein the primary tree defines a default path for the first node to forward data to the second node and the backup trees define other paths for the first node to forward data to the second node in case of a failure of the primary tree, wherein each of the plurality of backup trees is grouped into a backup-tree set with one or more other trees used respectively by one or more other nodes of the network as backup trees for forwarding data;
  transmit one or more continuity check messages to the second node on the primary tree and the backup tree;
  receive a failure signal transmitted from the second node;
  detect occurrence of a failure of the primary tree based on receipt of the failure signal transmitted from the other node, wherein the failure signal indicates a failure status of the primary tree;
  upon detection of the failure of the primary tree, switch the forwarding of data to the second node from the primary tree to a first backup-tree comprised within a backup-tree set comprising trees that are all usable by their respective nodes to simultaneously avoid the failure;
 wherein the plurality of backup-tree sets are assigned with different backup-tree-set priorities;
 wherein the one or more processing circuits are configured to, upon detection of the failure of the primary tree, select the first backup-tree based on the priorities.

12. The first node of claim 11 wherein the one or more processing circuits are configured to detect the occurrence of the failure of the primary tree based on the presence of one or more modified continuity check messages in the failure signal, wherein the modified continuity check messages comprise a Remote Defect Indication field indicating the failure status of the primary tree.

13. The first node of claim 12 where the one or more processing circuits are further configured to switch the forwarding of data back to the primary tree when the first node ceases to receive the modified continuity check messages transmitted from second node.

14. The first node of claim 11 wherein the one or more processing circuits are configured to detect the occurrence of the failure of the primary tree based on the presence of a failure notification message in the failure signal, wherein the failure notification message comprises an identification of the primary tree.

15. The first node of claim 14 wherein the one or more processing circuits are further configured to switch the forwarding of data back to the primary tree upon receipt of a reparation signal transmitted from the second node, wherein the reparation signal indicates a restored status of the primary tree.

* * * * *

UNITED STATES PATENT AND TRADEMARK OFFICE
CERTIFICATE OF CORRECTION

PATENT NO. : 8,923,112 B2
APPLICATION NO. : 13/394446
DATED : December 30, 2014
INVENTOR(S) : Farkas Page 1 of 1

It is certified that error appears in the above-identified patent and that said Letters Patent is hereby corrected as shown below:

IN THE SPECIFICATION

In Column 5, Lines 52-53, delete "transmined" and insert -- transmitted --, therefor.

In Column 6, Line 39, delete "tree, the is" and insert -- tree, the --, therefor.

In Column 9, Line 5, delete "form warding" and insert -- forwarding --, therefor.

In Column 15, Line 66, delete "detesting" and insert -- detecting --, therefor.

In Column 16, Line 13, delete "to the following" and insert -- the following --, therefor.

In Column 20, Line 7, delete "is below may" and insert -- below may --, therefor.

Signed and Sealed this
Ninth Day of February, 2016

Michelle K. Lee
*Director of the United States Patent and Trademark Office*